United States Patent
Davidson et al.

(10) Patent No.: US 12,403,543 B2
(45) Date of Patent: Sep. 2, 2025

(54) SYSTEMS AND METHODS TO START ARC WELDING

(71) Applicant: Illinois Tool Works Inc., Glenview, IL (US)

(72) Inventors: Robert R. Davidson, New London, WI (US); Peter Mehn, Oshkosh, WI (US); John Smith, Glendale Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 836 days.

(21) Appl. No.: 16/171,727

(22) Filed: Oct. 26, 2018

(65) Prior Publication Data

US 2020/0130094 A1    Apr. 30, 2020

(51) Int. Cl.
*B23K 9/12* (2006.01)
*B23K 9/067* (2006.01)
*B23K 9/073* (2006.01)
*B23K 9/095* (2006.01)
*B23K 9/10* (2006.01)

(52) U.S. Cl.
CPC ............ *B23K 9/125* (2013.01); *B23K 9/0672* (2013.01); *B23K 9/0737* (2013.01); *B23K 9/0956* (2013.01); *B23K 9/1062* (2013.01)

(58) Field of Classification Search
CPC .... B23K 9/125; B23K 9/0672; B23K 9/0737; B23K 9/0956; B23K 9/1062
USPC ................. 219/130.1, 130.21, 130.33, 130.4
See application file for complete search history.

(56) References Cited

U.S. PATENT DOCUMENTS 4,553,018 A * 11/1985 Kondo ................... B23K 9/091
                                            219/130.33
9,808,882 B2   11/2017 Hutchison
2004/0016735 A1   1/2004 Huismann
(Continued)

FOREIGN PATENT DOCUMENTS

| EP | 0324960 | 7/1989 |
| JP | 2006231414 | 9/2006 |
| WO | 2014013322 | 1/2014 |

OTHER PUBLICATIONS

Extended European Search Report Appln No. 19205094.6 dated Aug. 20, 2020.

*Primary Examiner* — Steven W Crabb
*Assistant Examiner* — Alba T Rosario-Aponte
(74) *Attorney, Agent, or Firm* — McAndrews, Held & Malloy, Ltd.

(57) ABSTRACT

Systems and methods to start arc welding are disclosed. An example welding-type power supply includes: power conversion circuitry configured to convert input power to welding-type power; and control circuitry configured to: prior to a welding operation, control the power conversion circuitry to stop outputting the welding-type power to a wire electrode; and in response to identifying contact between the wire electrode and a workpiece: control the power conversion circuitry to output an arc starting current to the wire electrode; control a feed motor of a welding torch to retract the wire electrode; control the feed motor to advance the wire electrode based on a first parameter of the welding operation; and control the power conversion circuitry to output the welding-type power to the wire electrode based on the first parameter or a second parameter of the welding operation.

17 Claims, 5 Drawing Sheets

(56) References Cited

U.S. PATENT DOCUMENTS

| | | | |
|---|---|---|---|
| 2010/0213181 A1* | 8/2010 | Hirota | B23K 9/0671 |
| | | | 219/130.31 |
| 2013/0146575 A1 | 6/2013 | Hillen | |
| 2013/0228559 A1 | 9/2013 | Daniel | |
| 2014/0001166 A1 | 1/2014 | Peters et al. | |
| 2014/0014627 A1 | 1/2014 | Van Boxtel | |
| 2014/0131332 A1* | 5/2014 | Henry | B23K 9/125 |
| | | | 219/130.21 |
| 2015/0209913 A1* | 7/2015 | Denney | B23K 9/173 |
| | | | 219/76.14 |
| 2017/0050258 A1 | 2/2017 | Hillen | |
| 2017/0165779 A1* | 6/2017 | Barhorst | B23K 9/095 |
| 2017/0225253 A1* | 8/2017 | Matsuoka | B23K 9/09 |
| 2018/0264575 A1 | 9/2018 | Peters et al. | |
| 2021/0101218 A1* | 4/2021 | Schorghubler | B23H 9/06 |

\* cited by examiner

SYSTEMS AND METHODS TO START ARC WELDING

BACKGROUND

This disclosure relates generally to welding systems and, more particularly, to systems and methods to start arc welding.

Welding-type components (e.g., welding torches) are sometimes powered by welding-type power supplies. Conventional power supplies use a range of electrical components and/or electrical circuitry to produce appropriate welding-type power for various welding-type operations and/or welding-type components.

Conventional short circuit gas metal arc welding (GMAW), also referred to as metal inert gas (MIG) welding, is a welding process in which an electric arc forms between an electrode and pieces of metal that are to be welded. The electric arc generates heat that causes the pieces of metal to melt. Upon cooling down of the melted pieces of metal, the pieces of metal join and form a weld. Electrical and/or physical parameters can be adjusted to give the best electric arc possible and improve the overall welding process.

SUMMARY

Systems and methods to start arc welding are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
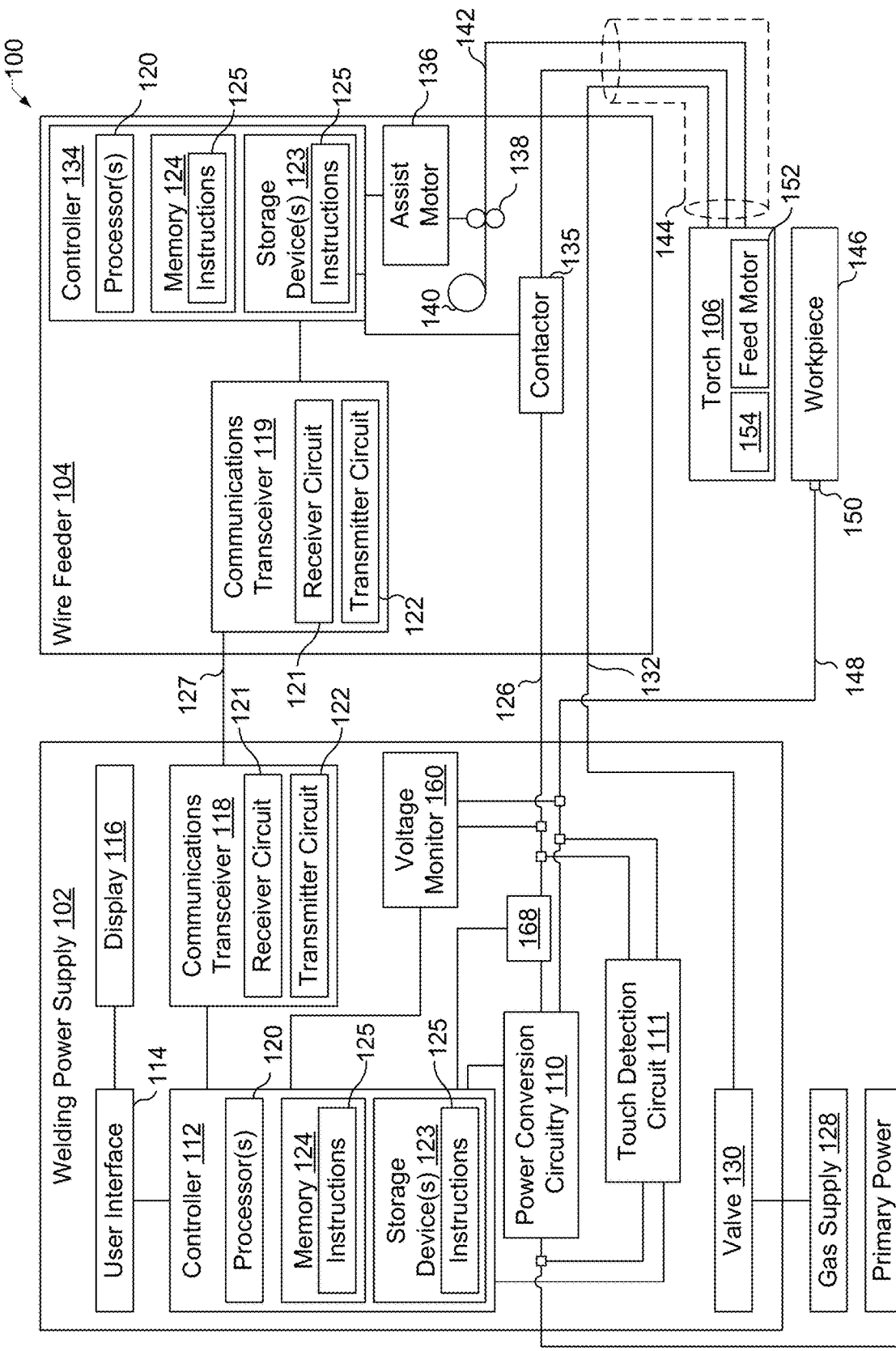
FIG. 1 is an illustration of an example welding-type system in accordance with aspects of this disclosure.

Conventional arc initiation techniques involve advancing (e.g., running in) a wire electrode to touch the workpiece. When the wire electrode contacts the workpiece, the weld circuit is complete and current begins to flow. This conventional arc initiation technique requires a large amount of energy to ignite the weld arc, and the weld current is typically in the 350-500 A range. When the arc does ignite, the large amount of energy flowing through the wire tends to result in large amounts of spatter. After the arc initiation, the wire feed rate and/or power source energy are ramped from starting parameters to steady-state welding parameters.

Some conventional arc initiation techniques involve retracting the wire (referred to as retract arc starts). Conventional retract arc starts are similar to conventional arc initiation in that the wire is advanced toward the workpiece at a reduced rate and touches the plate. A lower current is used to ignite the arc. Typical currents in retract arc starts may be 20-100 amps. The arc is ignited with the aid of a mechanical process in which the wire is retracted out of contact with the workpiece (referred to as wire retraction) by reversing the direction of a wire feeding motor. As the wire is retracted, the current is increased to 50-125 amps to support the arc. As the wire is retracted back at this current, the short circuit between the wire and the workpiece is cleared and the wire retraction initiates an arc. After the arc initiation, the wire feed rate and/or power source energy are ramped from starting parameters to steady-state welding parameters.

Conventional retract arc starts occur at lower energy levels and reduce the spatter compared with conventional arc starts. However, at the time the wire electrode contacts the workpiece, the power source is operational and under the right conditions the current can spot weld the wire to the workpiece. A conventional welding power supply may be designed to run at hundreds of amps, and does not typically have precise current control and/or current response at lower current levels. The possibility of spot-welding the wire requires the workpiece to be securely attached or clamped down, or the attempted retraction of the wire electrode will move the weld plate, which can disrupt automated and/or manual welding operations.

Disclosed example methods and apparatus involve detecting contact between the wire electrode and the workpiece while welding-type power is disabled or otherwise not provided to the wire electrode. In some examples, the contact is detected using a low-current power source that detects the closing of a circuit when the wire electrode makes contact with the workpiece. When the contact is detected, the welding-type power may then be enabled or otherwise provided to the wire electrode, which initiates the arc when the wire electrode is retracted from the workpiece.

Lower current means a reduced or eliminated likelihood of spot welding the wire in the tip and/or reduced or eliminated hot spots during arc initiation. In contrast, welding-type current levels can cause the wire to create a spot weld (e.g., spot welding of the wire electrode to the contact tip inside the weld torch) and/or a hot spot (e.g., localized wire heating at the point the wire has contact with the contact tip in the torch). These effects reduce contact tip life and/or reduce the ability to smoothly feed wire to the weld (e.g., spot welds rubs on the wire after separation, resulting in wire snaring and/or reduced contact tip life), and are reduced or prevented by disclosed example methods and apparatus. Additionally or alternatively, a hot spot may result in the wire separating at the hot spot point and a flare at arc initiation, which is also reduced or prevented by disclosed example methods and apparatus.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "weld voltage setpoint" refers to a voltage input to the power converter via a user interface, network communication, weld procedure specification, or other selection method.

As used herein, a "circuit" includes any analog and/or digital components, power and/or control elements, such as a microprocessor, digital signal processor (DSP), software, and the like, discrete and/or integrated components, or portions and/or combinations thereof.

Disclosed example welding-type power supplies include power conversion circuitry configured to convert input power to welding-type power, and control circuitry configured to: prior to a welding operation, control the power conversion circuitry to stop outputting the welding-type power to a wire electrode. The control circuitry is further configured to, in response to identifying contact between the wire electrode and a workpiece: control the power conversion circuitry to output a starting feed speed arc starting current to the wire electrode; control a feed motor of a welding torch to retract the wire electrode; control the feed motor to advance the wire electrode based on a first parameter of the welding operation; and control the power conversion circuitry to output the welding-type power to the wire electrode based on the first parameter or a second parameter of the welding operation.

In some examples, the control circuitry is configured to identify the contact between the wire electrode and the workpiece based on a signal from a touch detection circuit coupled to the wire electrode and to the workpiece. Some example power supplies further include a touch detection circuit configured to output a touch detection signal, in which the control circuitry is configured to: control the touch detection circuit to output the touch detection signal to the wire electrode via output terminals; monitor a voltage at the output terminals; and in response to detecting that the voltage at the output terminals is less than a threshold, identify the contact between the wire electrode and the workpiece.

In some examples, the control circuitry is configured to, prior to controlling the power conversion circuitry to output the welding-type power to the wire electrode, control the feed motor to advance the wire electrode at a starting feed speed and control the power conversion circuitry to output a starting voltage output. In some examples, the control circuitry is configured to control an assistive feed motor of a wire feeder to retract the wire electrode by a predetermined amount in response to identifying an end of the welding operation.

In some examples, the control circuitry is configured to: monitor a voltage at output terminals of the power conversion circuitry while controlling the power conversion circuitry to output the arc starting current; and in response to detecting a threshold voltage, control the feed motor to advance the wire electrode at a starting feed speed and control the power conversion circuitry to output a starting voltage output. In some such examples, the control circuitry is configured to: control the feed motor to ramp a wire feed speed from the starting feed speed to a wire feed speed setpoint; and control the power conversion circuitry to ramp an output voltage from the starting voltage output to a welding voltage setpoint.

In some example power supplies, the control circuitry is configured to: after controlling the power conversion circuitry to stop outputting the welding-type power to the wire electrode and prior to identifying the contact between the wire electrode and the workpiece, control the feed motor of the welding torch to advance the wire electrode. In some examples, the control circuitry is configured to identify the contact between the wire electrode and the workpiece based on measuring a torque of the feed motor. In some examples, the control circuitry is configured to control the power conversion circuitry to output the arc starting current to the wire electrode before or simultaneously with controlling the controlling the feed motor to retract the wire electrode.

Disclosed example methods include: prior to a welding operation, controlling, via control circuitry, power conversion circuitry to stop outputting welding-type power to a wire electrode and, in response to identifying contact between the wire electrode and a workpiece: controlling, via the control circuitry, a feed motor of a welding torch to retract the wire electrode; controlling, via the control circuitry, the power conversion circuitry to output an arc starting current to the wire electrode; controlling, via the control circuitry, the feed motor to advance the wire electrode based on a first parameter of the welding operation; and controlling, via the control circuitry, the power conversion circuitry to output the welding-type power to the wire electrode based on the first parameter or a second parameter of the welding operation.

In some examples, the identifying of the contact between the wire electrode and the workpiece includes receiving, at the control circuitry, a signal from a touch detection circuit coupled to the wire electrode and to the workpiece. Some example methods further include: controlling, via the control circuitry, a touch detection circuit to output a touch detection signal to the wire electrode via output terminals; monitoring a voltage at the output terminals; and in response to detecting that the voltage at the output terminals is less than a threshold, identifying the contact between the wire electrode and the workpiece.

Some example methods further include controlling the feed motor to advance the wire electrode at a starting feed speed and controlling the power conversion circuitry to output a starting voltage output. Some example methods further include controlling an assistive feed motor of a wire feeder to retract the wire electrode by a predetermined amount in response to identifying an end of the welding operation.

Some example methods further include: monitoring a voltage at output terminals of the power conversion circuitry while controlling the power conversion circuitry to output the arc starting current; and in response to detecting a threshold voltage, controlling the feed motor to advance the wire electrode at a starting feed speed and control the power conversion circuitry to output a starting voltage output. Some example methods further include: controlling the feed motor to ramp a wire feed speed from the starting feed speed to a wire feed speed setpoint; and controlling the power conversion circuitry to ramp the output from the starting voltage output to a welding voltage setpoint.

Some example methods further include, after controlling the power conversion circuitry to stop outputting the welding-type power to the wire electrode and prior to identifying the contact between the wire electrode and the workpiece, controlling the feed motor of the welding torch to advance the wire electrode. In some example methods, the identifying of the contact between the wire electrode and the workpiece is based on measuring a torque of the feed motor.

Some disclosed example welding-type power supplies include: power conversion circuitry configured to convert input power to welding-type power; and control circuitry configured to: while the power conversion circuitry is not outputting the welding-type power to a wire electrode, identify contact between the wire electrode and a workpiece; in response to identifying the contact, control the power conversion circuitry to output an arc starting current to the wire electrode and control a feed motor of a welding torch to retract the wire electrode.

Some disclosed example welding-type power supplies include: power conversion circuitry configured to convert input power to welding-type power; and control circuitry configured to: prior to a welding operation, control the power conversion circuitry to stop outputting the welding-type power to a wire electrode; and, in response to identifying contact between the wire electrode and a workpiece: control the power conversion circuitry to output an arc starting current to the wire electrode; control a feed motor to retract the wire electrode; control the feed motor to advance the wire electrode based on a first parameter of the welding operation; and control the power conversion circuitry to output the welding-type power to the wire electrode based on the first parameter or a second parameter of the welding operation.

Turning now to the drawings, FIG. 1 is a block diagram of an example welding system 100 having a welding-type power supply 102, a wire feeder 104, and a welding torch 106. The welding system 100 powers, controls, and supplies consumables to a welding application. In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1 includes a wire feeder 104 (e.g., for GMAW or FCAW welding), the wire feeder 104 may be replaced by any other type of remote accessory device, such as a stick welding and/or TIG welding remote control interface that provides stick and/or TIG welding.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output.

The power supply 102 includes a controller 112 to control the operation of the power supply 102. The power supply 102 also includes a user interface 114. The controller 112, which is also referred to as "control circuitry," receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other current operating parameters. Specifically, the user interface 114 may include a display 116 for presenting, showing, or indicating, information to an operator. The controller 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base 100, etc.). In the example of FIG. 1, the controller 112 communicates with the wire feeder 104 via the weld circuit via a communications transceiver 118, as described below.

The controller 112 includes at least one controller or processor 120 that controls the operations of the power supply 102. The controller 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 may be communicatively coupled to the weld cable 126 to communicate (e.g., send/receive) data over the weld cable 126. The communications transceiver 118 may be implemented based on various types of power line communications methods and techniques. For example, the communications transceiver 118 may utilize IEEE standard P1901.2 to provide data communications over the weld cable 126. In this manner, the weld cable 126 may be utilized to provide welding power from the power supply 102 to the wire feeder 104 and the welding torch 106. Additionally or alternatively, a communication cable 127 may be used to transmit and/or receive data communications between the communications transceiver 118 and a similar communications transceiver 119 of the wire feeder 104.

The example communications transceiver 118 includes a receiver circuit 121 and a transmitter circuit 122. Generally, the receiver circuit 121 receives data transmitted by the wire feeder 104 and the transmitter circuit 122 transmits data to the wire feeder 104. In some examples, the receiver circuit 121 receives communication(s) via the weld circuit while weld current is flowing through the weld circuit (e.g., during a welding-type operation) and/or after the weld current has stopped flowing through the weld circuit (e.g., after a welding-type operation).

Example implementations of the communications transceiver 118 are described in U.S. Pat. No. 9,012,807. The entirety of U.S. Pat. No. 9,012,807 is incorporated herein by reference. However, other implementations of the communications transceiver 118 may be used.

The example wire feeder 104 also includes a communications transceiver 119, which may be similar or identical in construction and/or function as the communications transceiver 118.

The example power supply 102 includes a voltage monitor 160 and a current monitor 168. The voltage monitor 160 monitors an output voltage from the welding power supply 102. The output voltage may be controlled by the power conversion circuitry 110, the touch detection circuitry 111, an external voltage source, current source, and/or load, and/or any other internal or external cause of voltage. The current monitor 168 monitors an output current. While the example current monitor 168 is illustrated monitoring the output current from the power conversion circuitry 110, the current monitor 168 may be configured to monitor any currents flowing through the output terminals of the power supply 102 and/or for any particular circuits. For example, the current monitor 168 may detect whether a current is flowing when the touch detection circuitry 111 is outputting a voltage and the power conversion circuitry 110 is disabled.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid state device, and/or may be omitted when the power supply 102 is configured to control the output of welding-type power to the torch 106. The controller 112 and/or the controller 134 may control the contactor 135 to close and/or open to provide power to the torch 106. The wire feeder 104 includes an assist motor 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The wire electrode, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the power supply 102 to the workpiece 146.

The example torch 106 includes a bidirectional feed motor 152, which is configured to pull a wire electrode from the wire feeder to the torch 106 to feed the wire to a welding arc during welding operations. The feed motor 152 may also be controlled to reverse the wire direction to retract wire from the workpiece. Changing wire speeds and/or reversing wire may be used in some welding processes to reduce spatter and/or achieve desired welding results. The assist motor 136 may operate as an assist motor to pull wire from the spool 140 and feed the wire toward the torch 106, while the example feed motor 152 advances and retracts the wire electrode to control short circuiting and/or arc length during welding.

The touch detection circuitry 111 includes circuitry configured to detect electrical contact between the torch 106 (e.g., an electrode held by the torch 106) and the workpiece 146. For example, the touch detection circuitry 111 applies an output voltage to the output terminals of the power supply 102, which may be the same output terminals used by the power conversion circuitry 110 to output welding-type power. The touch detection circuitry 111 monitors the output to detect a current, which occurs when the torch 106 makes electrical contact (e.g., via the electrode) with the workpiece 146 to close the circuit and permit the current to flow. The example touch detection circuitry 111 may be output-limited to a low current (e.g., less than 10 mA), and provides a detection signal to the controller 112 in response to detecting the flow of current.

To reduce or eliminate the deficiencies of conventional arc initiation techniques discussed above, the example controller 112 controls the power conversion circuitry 110 to not generate an output during the initial contact between the wire electrode and the workpiece. Instead, the controller 112 uses the touch detection circuitry 111 to detect contact between the wire electrode and the workpiece 146 with a current that does not risk spot welding the wire electrode to the workpiece 146. After detection of contact, the controller 112 may enable or otherwise control the power conversion circuitry 110 to output arc starting current and/or welding current to initiate the arc.

Figure 2:
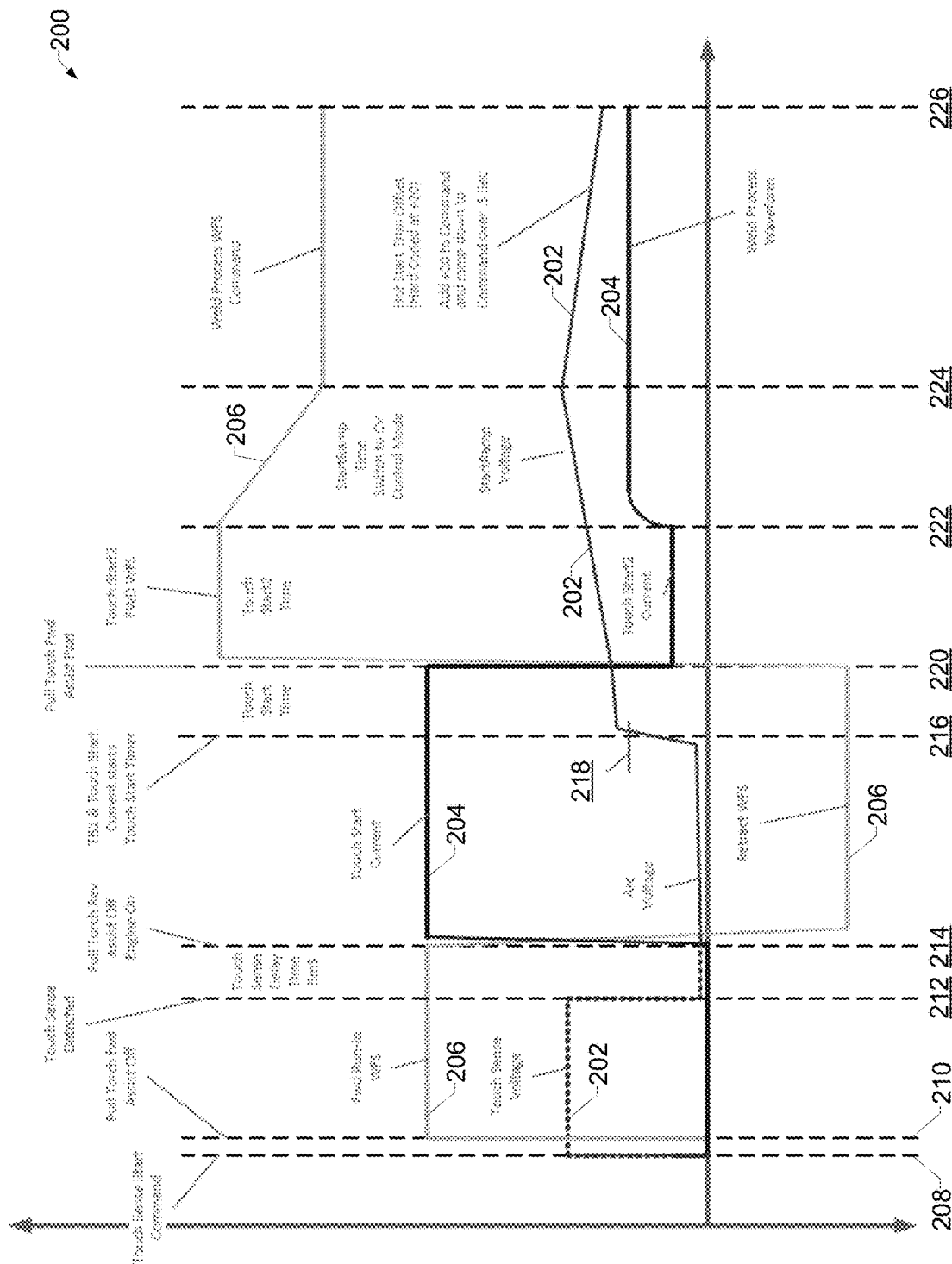
FIG. 2 is a graph illustrating example voltages, currents, and wire feed speed commands in the system of FIG. 1 during initiation of a welding arc.
Figure 3A:
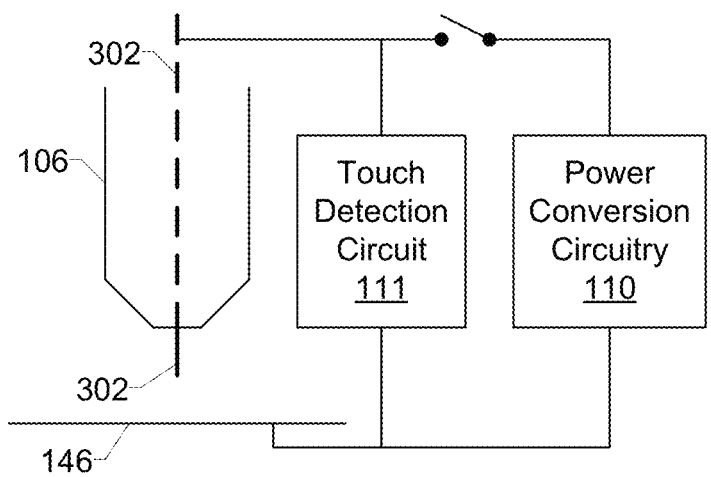
FIGS. 3A-3C illustrate an example sequence of electrode and workpiece contact during initiation of a welding arc.
Figure 3B:
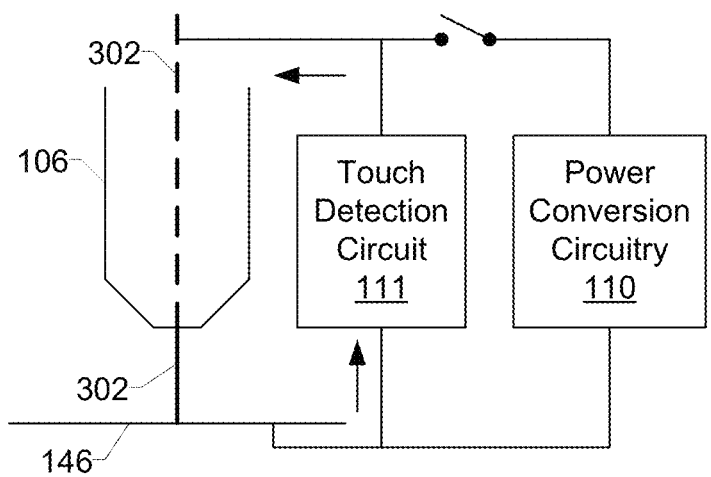
Figure 3C:
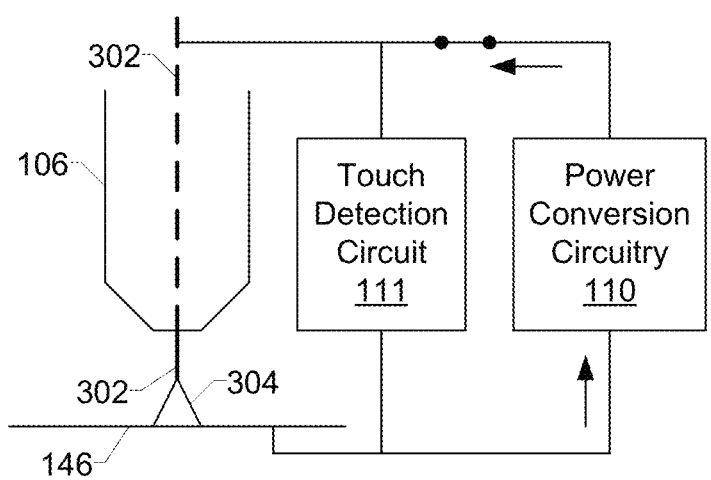

FIG. 2 is a graph 200 illustrating example voltages, currents, and wire feed speed commands in the system of FIG. 1 during initiation of a welding arc. FIGS. 3A-3C illustrate a simplified example sequence of electrode and workpiece contact during initiation of a welding arc. For the sake of clarity, FIGS. 3A-3C omit elements such as the weld cable 126, the contactor 135, and the like, that connect the elements shown in FIGS. 3A-3C.

The example graph 200 illustrates voltage feedback signal 202 (e.g., a voltage measured by the voltage monitor 160), a current feedback signal 204 (e.g., a current measured by the current monitor 168), and a wire feed speed command signal 206 (e.g., a wire feed speed command output by the controller 112 to the wire feeder 104). The wire feed speed signal 206 of FIG. 2 includes both positive values to indicate wire advancement and negative values to indicate wire retraction. The example signals 202-206 are for the purposes of illustration, and are not necessarily to scale.

At a first time 208, a welding initiation signal is generated, such as by the depression of a trigger of the welding torch 106 and/or an initiation signal by a robotic welding controller. In response to the welding initiation signal, the controller 112 controls the touch detection circuitry 111 to output a voltage between the wire electrode (e.g., the torch 106) and the workpiece 146, and monitors for current flow that indicates contact between the wire electrode and the workpiece 146 by completion of the circuit. The example voltage feedback signal 202 increases to the output voltage of the touch detection circuitry 111.

In the example of FIG. 2, after enabling the touch detection circuitry 111, at time 210 the controller 112 controls the feed motor 152 of the torch 106 to begin advancing the wire electrode (as illustrated by the increase in the wire feed speed signal 206). The feed motor 152 may advance the wire at a relatively low starting speed to reduce the time required to reverse the wire feed speed to retract the wire electrode. To assist with subsequent retraction, the controller 112 does not enable the assist motor 136, which causes the feed motor 152 to reduce compression and/or increase tension of the wire electrode within the torch cable 144 (e.g., within a wire liner in the torch cable 144).

FIG. 3A illustrates an example wire electrode 302, a portion of the welding torch 106, and the workpiece 146 at time 208 and/or time 210. As illustrated in FIG. 3A, the power conversion circuitry 110 is prevented from outputting welding-type power to the wire electrode 302. While prevention of welding-type power output is illustrated in FIG. 3A as an open switch physically disconnecting the power conversion circuitry 110 from the electrode 302, the controller 112 may alternatively control elements of the power conversion circuitry 110 (e.g., switching elements of a switched mode power supply implementation) to prevent output of welding-type power from the power conversion circuitry 110.

In some other examples, the controller 112 does not control the feed motor 152 to advance the wire electrode. Instead, movement of the torch 106 by the operator or a robot is relied on to cause the electrical contact between the wire electrode 302 and the workpiece 146.

At time 212, the controller 112 detects the contact between the wire electrode and the workpiece 146 via the touch detection circuitry 111, which causes a decrease in the voltage feedback signal 202 and detection of a non-zero current output from the touch detection circuitry 111. In response to detecting the contact, at time 214 the controller 112 controls the feed motor 152 to retract the wire electrode 302 and controls the power conversion circuitry 110 to output an arc starting current. Outputting the arc starting current may occur prior to or simultaneously with beginning to retract the wire electrode 302. In the example of FIG. 2, the controller 112 sets a delay or lower time limit on the contact before initiating the starting current and retracting the wire.

FIG. 3B illustrates the example wire electrode 302, a portion of the welding torch 106, and the workpiece 146 at time 212 and/or time 214 (e.g., before the wire electrode 302 is retracted out of contact with the workpiece 146). In the example of FIG. 3B, a circuit is formed by the touch detection circuitry 111, the wire electrode 302, and the workpiece 146 (and connecting circuitry), permitting current to flow and indicating that contact is made between the wire electrode 302 and the workpiece 146. The power conversion circuitry 110 has not yet been enabled or controlled to output the welding-type power.

Between time 214 and 216, the wire electrode 302 is retracted and welding-type power is output by the power conversion circuitry 110 to the wire electrode 302, which results in arc initiation and a rising output voltage (e.g., an increasing voltage feedback signal 202) as the arc length increases. At time 216, the controller 112 identifies that the voltage feedback signal 202 has reached a threshold voltage 218. In the example of FIG. 2, the controller 112 continues to retract the wire electrode 302 for a time duration following the identification of the threshold voltage 218, until time 220.

At time 220, the example controller 112 changes to a transition mode, in which the controller 112 again controls the feed motor 152 to advance the wire electrode 302 toward the workpiece 146. The controller 112 further controls the assist motor 136 to advance the wire electrode 302 and reduces the output current of the power conversion circuitry 110. For example, the controller 112 may reduce the output current at time 220 to reduce the energy input to the workpiece 146 to reduce spatter during the transition mode.

In other examples, the controller 112 may immediately change to the ramp-in mode following the identification of the threshold voltage 218, omitting the additional wire retraction time between time 216 and 220.

FIG. 3C illustrates the example wire electrode 302, a portion of the welding torch 106, and the workpiece 146 at time 216 and/or time 220 (e.g., when an arc 304 is established between the wire electrode 302 and the workpiece 146 by the power conversion circuitry 110). In the example of FIG. 3C, the power conversion circuitry 110 is enabled to output the welding-type power to the wire electrode 302, which provides power to initiate the arc 304.

At time 222, the controller 112 changes to a ramp mode to transition the wire feed speed and the welding-type output based on the setpoints designated for the welding operation. In the example of FIG. 2, the voltage is ramped to a hot start voltage that is set higher than the setpoint voltage, and the controller 112 controls the power conversion circuitry 110 to ramp such that the hot start voltage is reached at time 224 over a predetermined time duration. The controller 112 controls the power conversion circuitry 110 to ramp the output voltage and/or output current based on the voltage and/or current at the time 222 to the steady-state or setpoint voltage and/or current, and based on a ramp time.

At time 226, the controller 112 controls the power conversion circuitry 110 and the wire feeder 104 (e.g., including the feed motor 152 and the assist motor 136) according to a selected welding process (e.g., a welding program, output setpoints, etc.).

In some examples, at the conclusion of a welding operation (e.g., when the arc is extinguished), the controller 112 may control the assist motor 136 to reverse for a short period to reduce a compression of the wire electrode 302 within the wire liner. Some assist motors may tend to introduce some compression in the wire electrode within the wire liner, which can make retracting the wire electrode difficult during the next arc starting procedure.

Figure 4A:
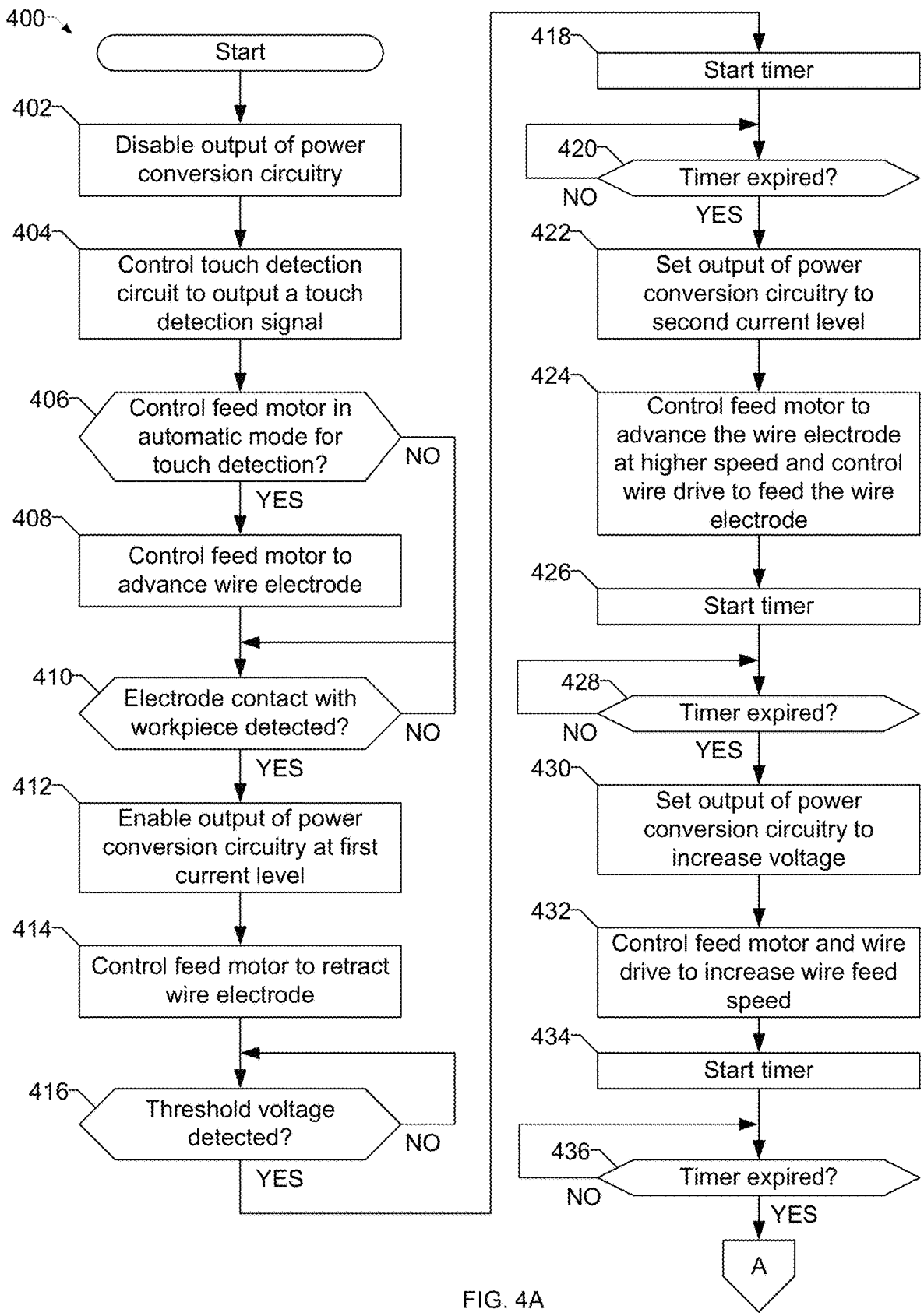
FIGS. 4A and 4B are a flowchart representative of example machine readable instructions which may be executed by the welding system of FIG. 1 to control initiation of a welding arc.
Figure 4B:
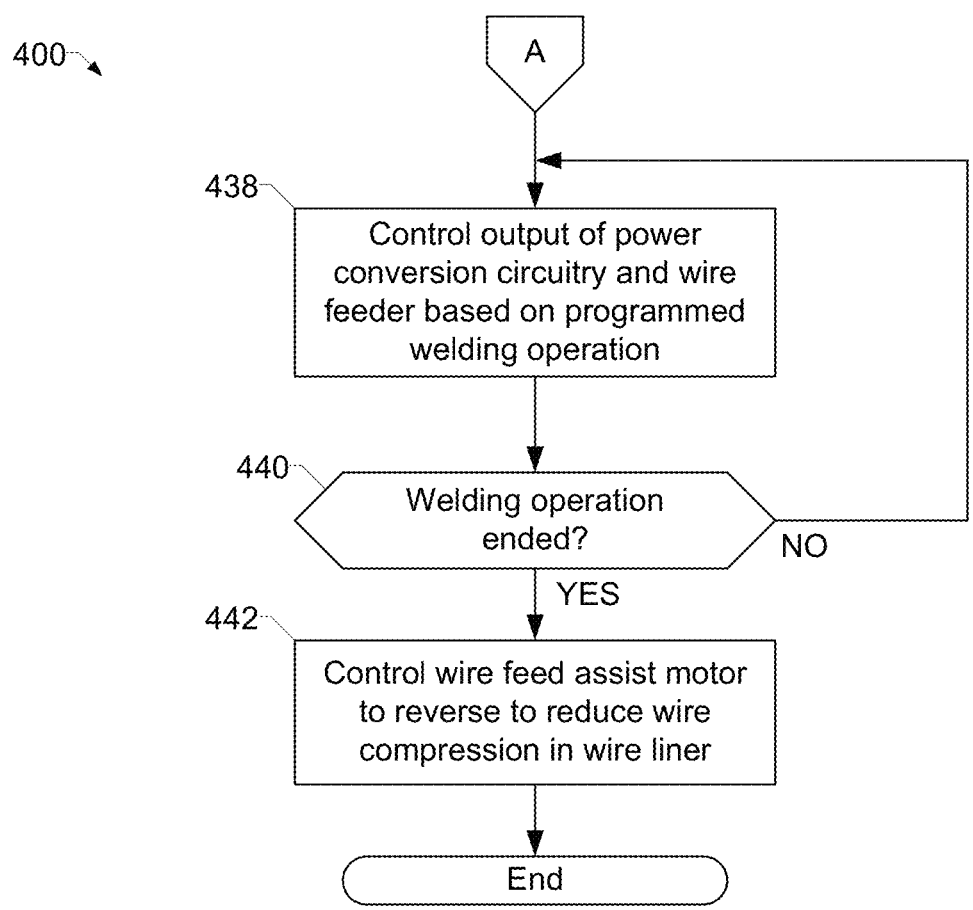

FIGS. 4A and 4B are a flowchart representative of example machine readable instructions 400 which may be executed by the welding system 100 of FIG. 1 to control initiation of a welding arc. For example, the controller 112 (e.g., via the processor(s) 120) may execute the instructions 400 stored in the storage device(s) 123 and/or the memory 124. The example instructions 400 are described below with reference to the system 100 of FIG. 1.

At block 402, the controller 112 disables the output of the power conversion circuitry 110. For example, the controller 112 may control a switching element to disconnect the power conversion circuitry 110 from output terminals of the welding-type power supply 102 and/or control the power conversion circuitry 110 to not output power.

At block 404, the example controller 112 controls the touch detection circuitry 111 to output a touch detection signal. An example touch detection signal may include a sufficient voltage and a low current.

At block 406, the controller 112 determines whether the wire feeder 104 is to be controlled in an automatic mode for touch detection. In an automatic mode, contact between the wire electrode 302 and the workpiece 146 is created by advancing the wire electrode 302 using the feed motor 152 in the torch 106. Conversely, in a non-automatic (e.g., manual) mode, the contact between the wire electrode 302 and the workpiece 146 is created by moving the torch 106 toward the workpiece 146. The wire electrode 302 has a fixed stickout from the welding torch 106, and movement of the welding torch 106 may be caused by an operator, a robot, a manipulator, and/or any other source of torch manipulation.

If the wire feeder 104 is to be controlled in an automatic mode for touch detection (block 406), at block 408 the controller 112 controls the feed motor 152 to advance the wire electrode 302. After beginning to advance the wire electrode (block 408) or if the feed motor 152 is not to be controlled in an automatic mode for touch detection (block 406), at block 410 the controller 112 determines whether contact between the wire electrode 302 and the workpiece 146 is detected. For example, the controller 112 may determine whether a current has been detected by the touch detection circuitry 111. If contact has not been detected (block 410), the controller 112 iterates block 410 to monitor for the contact.

When contact is detected (block 410), at block 412 the controller 112 enables output of the power conversion circuitry 110 at a first current level. In some examples, the controller 112 may disable (e.g., turn off, disconnect) the touch detection circuitry 111 when the power conversion circuitry 110 is enabled. At block 414, the controller 112 controls the feed motor 152 to retract the wire electrode 302. As a result of blocks 412 and 414, an arc is typically initiated due to the wire retraction and the power output by the power conversion circuitry 110.

Following the arc initiation, the arc voltage increases as the wire electrode 302 is melted and/or the feed motor 152 continues to retract the wire electrode 302. At block 416, the controller 112 determines whether at least a threshold voltage is detected (e.g., via the voltage monitor 160). If a threshold voltage is not detected (block 416), the controller 112 iterates block 416 to monitor for the threshold voltage.

When the threshold voltage is detected (block 416), at block 418 the controller 112 starts a timer, after which the control mode for the power conversion circuitry 110 changes. At block 420, the controller 112 determines whether the timer has expired (e.g., whether a countdown timer has reached a threshold such as zero, whether a count up timer has reached a target value, etc.). If the timer has not expired (block 420), the controller 112 iterates block 420 to monitor for timer expiration.

When the timer expires (block 420), at block 422 the controller 112 sets an output of the power conversion circuitry 110 to a second current level. For example, the controller 112 may set the output current to a low level that reduces spatter during the initial phases of the welding operation. At block 424, the controller 112 controls the feed motor 152 to advance the wire electrode 302 and controls the assist motor 136 to feed the wire electrode 306. In some examples, the controller 112 may control the feed motor 152 and/or the assist motor 136 to advance the wire electrode 302 at a higher advancement rate to quickly reverse the wire direction and reduce the arc length, while controlling the power conversion circuitry 110 to output a lower current than the arc initiation current in blocks 412-420.

At block 426 the controller 112 starts a timer, after which the control mode for the power conversion circuitry 110 changes to a ramping mode. At block 428, the controller 112 determines whether the timer has expired (e.g., whether a countdown timer has reached a threshold such as zero, whether a count up timer has reached a target value, etc.). If the timer has not expired (block 428), the controller 112 iterates block 428 to monitor for timer expiration.

When the timer has expired (block 428), at block 430 the controller 112 sets an output of the power conversion circuitry 110 to increase the output voltage and, at block 432, controls the feed motor 152 and the assist motor 136 to increase the wire feed speed. For example, the controller 112 may control the power conversion circuitry 110, the feed motor 152, and the assist motor 136 to prepare for the selected weld process, voltage setpoint, and/or wire feed speed setpoint, and then to ramp the output voltage and wire feed speed to the selected voltage setpoint and/or wire feed speed setpoint.

At block 434 the controller 112 starts a timer, after which the control mode for the power conversion circuitry 110 changes to the welding operation. At block 436, the controller 112 determines whether the timer has expired (e.g., whether a countdown timer has reached a threshold such as zero, whether a count up timer has reached a target value, etc.). If the timer has not expired (block 436), the controller 112 iterates block 436 to monitor for timer expiration.

Turning to FIG. 4B, when the timer expires (block 436), at block 438 the controller 112 controls the output of the power conversion circuitry 110, the feed motor 152, and the assist motor 136 based on the programmed welding operation. At block 440, the controller 112 determines whether the welding operation has ended. For example, the controller 112 may determine whether a welding end command has been received and/or a trigger of the welding torch 106 has been released. If the welding operation has not ended (block 440), control returns to block 438 to continue the programmed welding operation.

When the welding operation is ended (block 440), at block 442 the controller 112 controls the assist motor 136 to reverse to reduce a wire compression in the wire liner. The example instructions 400 then end.

In some examples, blocks 418 and 420, blocks 426 and 428, and/or blocks 434 and 436 may be omitted, in which case the controller 112 may continue to the subsequent mode immediately in response to detecting a triggering event (e.g., contact between the wire electrode and the workpiece, a target voltage, etc.).

While the examples disclosed above are described with reference to controlling the feed motor of a welding torch to retract the wire, in other examples the welding torch does not have a feed motor. In such examples, the feed motor is implemented in the wire feeder 104 and/or in the power supply 102, and is controlled to advance and retract the wire electrode. The feed motor may be controlled as described above, with modifications to compensate for compression and/or tension in the length of wire electrode between the feed motor and the torch 106. For example, modifications may include increasing the timing to change from advancing the wire electrode to retracting the wire electrode and/or from retracting the wire electrode to advancing the wire electrode.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   power conversion circuitry configured to convert input power to welding-type power, and configured to output the welding-type power to output terminals;
   a touch detection circuit coupled to the output terminals, in parallel with the power conversion circuitry, and configured to output a touch detection signal via the output terminals; and
   control circuitry configured to:
      prior to a welding operation, disable output of the welding-type power to the output terminals by the power conversion circuitry;
      monitor the output terminals based on the touch detection signal to identify a contact between a wire electrode and a workpiece coupled to the output terminals; and
      in response to identifying the contact between the wire electrode and the workpiece:
         control the power conversion circuitry to output an arc starting current to the output terminals to initiate an arc;
         while the arc starting current is being output to the output terminals, control a feed motor of a welding torch to retract the wire electrode;
         control the feed motor to advance the wire electrode based on a first parameter of the welding operation;
         control the power conversion circuitry to output the welding-type power to the output terminals based on the first parameter or a second parameter of the welding operation;
         monitor for a threshold voltage; and
         when the threshold voltage is reached, (1) change to a transition mode and start a timer or (2) switch to a ramp-in mode.

2. The welding-type power supply as defined in claim 1, wherein the control circuitry is configured to, prior to controlling the power conversion circuitry to output the welding-type power to the output terminals, control the feed motor to advance the wire electrode at a starting feed speed and control the power conversion circuitry to output a starting voltage output.

3. The welding-type power supply as defined in claim 1, wherein the control circuitry is configured to control an assistive feed motor of a wire feeder to retract the wire electrode by a predetermined amount in response to identifying an end of the welding operation.

4. The welding-type power supply as defined in claim 1, wherein the control circuitry is configured to:

monitor a voltage at output terminals of the power conversion circuitry while controlling the power conversion circuitry to output the arc starting current; and in response to detecting a threshold voltage, control the feed motor to advance the wire electrode at a starting feed speed and control the power conversion circuitry to output a starting voltage output.

5. The welding-type power supply as defined in claim 4, wherein the control circuitry is configured to:

control the feed motor to ramp a wire feed speed from the starting feed speed to a wire feed speed setpoint; and control the power conversion circuitry to ramp an output voltage from the starting voltage output to a welding voltage setpoint.

6. The welding-type power supply as defined in claim 1, wherein the control circuitry is configured to: after disabling of the output of the welding-type power and prior to identifying the contact between the wire electrode and the workpiece, control the feed motor of the welding torch to advance the wire electrode.

7. The welding-type power supply as defined in claim 1, wherein the control circuitry is configured to control the power conversion circuitry to output the arc starting current to the wire electrode before or simultaneously with controlling the controlling the feed motor to retract the wire electrode.

8. The welding-type power supply as defined in claim 1, wherein the control circuitry is configured to identify the contact between the wire electrode and the workpiece coupled to the output terminals in response to detecting one or more of: 1) a current present at the output terminals or 2) a voltage across the output terminals being less than the threshold voltage.

9. The welding-type power supply as defined in claim 1, wherein the control circuitry is configured to disable output of the welding-type power to the output terminals by the power conversion circuitry by controlling a switching element to disconnect the power conversion circuitry from the output terminals.

10. The welding-type power supply as defined in claim 1, wherein the control circuitry is configured to disable output of the welding-type power to the output terminals by the power conversion circuitry by controlling the power conversion circuitry to not output power.

11. The welding-type power supply as defined in claim 1, wherein the control circuitry is further configured to set a current output to a current level when the timer expires.

12. The welding-type power supply as defined in claim 1, wherein in the transition mode, the control circuitry reduces output current to the workpiece while advancing the wire electrode for a period of time before switching to the ramp-in mode.

13. The welding-type power supply as defined in claim 12, wherein in the ramp-in mode, the control circuitry advances the wire electrode when the threshold voltage is reached.

14. A welding-type power supply, comprising:

power conversion circuitry configured to convert input power to welding-type power, and configured to output the welding-type power to output terminals;

a touch detection circuit coupled to the output terminals, in parallel with the power conversion circuitry, and configured to output a touch detection signal via the output terminals; and control circuitry configured to:

while the power conversion circuitry is not outputting the welding-type power to the output terminals:

control the touch detection circuit to output the touch detection signal to a wire electrode via the output terminals;

monitor the output terminals based on the touch detection signal to identify contact between the wire electrode and a workpiece coupled to the output terminals;

in response to identifying the contact, control the power conversion circuitry to output an arc starting current to the output terminals to initiate an arc and control a feed motor of a welding torch to retract the wire electrode while the arc starting current is being output to the output terminals;

monitor for a threshold voltage; and when the threshold voltage is reached, (1) change to a transition mode and start a timer or (2) switch to a ramp-in mode.

15. The welding-type power supply as defined in claim 14, wherein the control circuitry is configured to disable output of the welding-type power to the output terminals by the power conversion circuitry.

16. The welding-type power supply as defined in claim 14, wherein the control circuitry is configured to identify the contact between the wire electrode and the workpiece coupled to the output terminals in response to detecting one or more of: 1) a current present at the output terminals or 2) a voltage across the output terminals being less than threshold voltage.

17. The welding-type power supply as defined in claim 14, wherein the control circuitry is further configured to set a current output to a current level when the timer expires.

* * * * *